(12) United States Patent
Song et al.

(10) Patent No.: US 11,731,374 B2
(45) Date of Patent: Aug. 22, 2023

(54) METHOD FOR PREPARING SELF-FLOATING TRANSPARENT NANO ULTRATHIN FILM

(71) Applicant: DALIAN UNIVERSITY OF TECHNOLOGY, Dalian (CN)

(72) Inventors: Yongchen Song, Dalian (CN); Zheng Ling, Dalian (CN); Fuqiang Wang, Dalian (CN); Changrui Shi, Dalian (CN); Lu Wang, Dalian (CN); Jiafei Zhao, Dalian (CN); Yanghui Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/086,714

(22) Filed: Dec. 22, 2022

(65) Prior Publication Data
US 2023/0191718 A1 Jun. 22, 2023

Related U.S. Application Data

(63) Continuation of application No. PCT/CN2022/097054, filed on Jun. 6, 2022.

(30) Foreign Application Priority Data

Dec. 1, 2021 (CN) .......................... 202111450223.4

(51) Int. Cl.
| | | |
|---|---|---|
| B29C 67/00 | (2017.01) | |
| C01B 32/174 | (2017.01) | |
| C01B 32/159 | (2017.01) | |
| C01B 33/42 | (2006.01) | |
| C01B 32/194 | (2017.01) | |
| B29C 67/24 | (2006.01) | |
| B29K 105/16 | (2006.01) | |
| B29K 81/00 | (2006.01) | |
| B29K 1/00 | (2006.01) | |

(52) U.S. Cl.
CPC .......... *B29C 67/0011* (2013.01); *B29C 67/24* (2013.01); *C01B 32/159* (2017.08); *C01B 32/174* (2017.08); *C01B 32/194* (2017.08); *C01B 33/42* (2013.01); *B29K 2001/08* (2013.01); *B29K 2081/06* (2013.01); *B29K 2105/162* (2013.01); *C01B 2202/02* (2013.01); *C01B 2202/04* (2013.01); *C01B 2202/06* (2013.01); *C01P 2006/60* (2013.01)

(58) Field of Classification Search
CPC ... B29C 67/0011; B29C 67/24; C01B 32/159; C01B 32/174; C01B 32/194; C01B 33/42; C01B 2202/02; C01B 2202/04; C01B 2202/06; B29K 2001/08; B29K 2081/06; B29K 2105/162; C01P 2006/60
See application file for complete search history.

(56) References Cited

U.S. PATENT DOCUMENTS

2021/0250693 A1 8/2021 Spinelli et al.

FOREIGN PATENT DOCUMENTS

| CN | 102110489 A | 6/2011 |
|---|---|---|
| CN | 102173406 A | 9/2011 |
| CN | 106941049 A | 7/2017 |
| CN | 107053784 A | 8/2017 |
| CN | 110124529 A | 8/2019 |
| CN | 113526507 A | 10/2021 |

OTHER PUBLICATIONS

Chen, et al., Carbon nanotubes enhance flexible MXene films for high-rate supercapacitors, J. Mater. Sci. 2020; 55: 1148-1156 (Year: 2020).*
Weng, et al., Layer-by-Layer Assembly of Cross-Functionaly Semi-transparent MXene-Carbon Nanotubes Composite Films for Next-Generation Electromagnetic Interference Shielding, Adv. Funct. Mater. 2018; 28: 1803360 (pp. 1-9) (Year: 2018).*
Yu, et al., MXene/Carbon Nanotube Hybrids: Synthesis, Structures, Properties, and Applications, ChemSusChem 2021; 14: 5079-5111 (Year: 2021).*

* cited by examiner

*Primary Examiner* — Daniel C. McCracken
(74) *Attorney, Agent, or Firm* — Nitin Kaushik

(57) ABSTRACT

The present disclosure provides a method for preparing a self-floating transparent nano ultrathin film. According to the present disclosure, the MXene film layer and the nano ultrathin film layer are sequentially subjected to suction filtration on the substrate material by utilizing a vacuum suction filtration technology, and thus a double-film structure is loaded on the substrate material; then an oxidant is subjected to oxidizing and bubbling on the MXene film layer in a permeation way, and thus the substrate material and the nano ultrathin film layer can be separated in a physical isolating manner. Finally, the nano ultrathin film is completely separated in a liquid phase floating separation manner. The nano ultrathin film prepared by the method provided by the present disclosure has a specific thickness and light transmittance through different loading capacities, and the substrate material can be repeatedly utilized.

8 Claims, No Drawings

METHOD FOR PREPARING SELF-FLOATING TRANSPARENT NANO ULTRATHIN FILM

CROSS-REFERENCE TO RELATED APPLICATIONS

The application claims priority to Chinese patent application No. 2021114502234, filed on Dec. 1, 2021, the entire contents of which are incorporated herein by reference.

TECHNICAL FIELD

The present disclosure relates to the field of preparation and separation of nano films, and particularly relates to a method for preparing a self-floating transparent nano ultrathin film.

BACKGROUND

In the prior art, an ultrathin film which is based on single-walled carbon nanotubes and has high light transmittance and flexibility, has very small resistance and high light transmittance due to the excellent conductivity of the single-walled carbon nanotubes and very strong tight binding force among the single-walled carbon nanotubes. Due to a joule effect, a transparent single-walled carbon nanotube film has an electric heating performance surpassing other metal materials, so it attracts more and more researchers in the field of transparent electric heaters. It has huge application prospects in various devices in different fields of traffic, buildings, medical treatment, sports, and the like, such as intelligent windows, deicers, demisters, displays, thermal therapy pads, and sensors.

The ultrathin film is prepared by fixedly growing the single-walled carbon nanotubes on a substrate by a CVD method. Although a method for stripping the ultrathin film from a relatively thick film through a water and air interface is proved, the problems that the generated ultrathin film has randomness in thickness, the ultrathin film with a specific thickness cannot be generated in batches, the ultrathin film can only fixedly grow on one substrate, the method does not have universality and the application performance of the ultrathin film is limited exist. Although the thickness of the film can be controlled by controlling the loading capacity in a traditional vacuum suction filtration method, for a nanoscale ultrathin film, the ultrathin film cannot completely fall off from the substrate due to the binding force between the single-walled carbon nanotube and a suction filtration substrate.

SUMMARY

An objective of the present disclosure is to provide a method for preparing a self-floating transparent nano ultrathin film, which can quickly and efficiently prepare the self-floating transparent nano ultrathin film with a specific thickness and high light transmittance, has a wide selection range of preparation materials and is reusable in substrate material and wide application range.

The technical solution adopted by the present disclosure for solving the problems in the prior art is as follows: a method for preparing the self-floating transparent nano ultrathin film includes the following steps:

S1: preparing an MXene film layer on a substrate material: preparing MXene dispersion liquid with a concentration of 0.1-10 mg/mL; collecting the MXene dispersion liquid with a volume of 0.0064-0.6714 mL, and performing suction filtration on the substrate material in a vacuum suction filtration way to obtain the MXene film layer with a loading capacity of 0.01-0.05 mg/cm$^2$, thereby obtaining an MXene substrate film layer with uniform thickness;

S2: performing suction filtration on a nano ultrathin film layer: preparing dispersion liquid of ultrathin film building blocks with a concentration of 0.16-0.6 mg/mL; taking the dispersion liquid of the building blocks with a volume of 0.0522-0.223 mL, and performing suction filtration on the MXene substrate film layer obtained in the step S1 in a vacuum suction filtration way to obtain the nano ultrathin film layer with a loading capacity of 0.0008-0.05 mg/cm$^2$ to form a double-film structure on the substrate material, to obtain a double-film loaded substrate;

S3: oxidizing and bubbling: keeping a surface where the nano ultrathin film layer is located upward and standing the double-film loaded substrate on the surface of an oxidant solution at normal temperature to enable the oxidant solution to be transported upwards to the MXene film layer under the capillary action force of pores of the substrate material and enable an oxidant and MXene to be subjected to oxidation reaction to generate bubbles, thereby forming a bubble layer between the substrate material and the nano ultrathin film layer, the bubble layer serving as a separation layer to separate the substrate material from the ultrathin film layer to obtain a substrate loaded with the bubble layer and the nano ultrathin film;

S4: performing liquid phase separation: obliquely inserting the substrate loaded with the bubble layer and the nano ultrathin film into a liquid phase oxidant solution until the bubble liner carries the nano ultrathin film layer to float on the surface of the liquid phase oxidant solution to be completely separated from the substrate material, thereby obtaining a nano ultrathin film, The thickness of the nano ultrathin film is 15-120 nm, and the light transmittance is 50-95%.

The MXene dispersion liquid is a $Ti_3C_2T_x$ aqueous solution or a $Ti_2CT_x$ aqueous solution.

The substrate material comprises a mixed cellulose ester filter film, a microporous filter film, a polyether sulfone ultrafiltration film, and an aluminum oxide filter film.

In the step S2, the dispersion liquid of the ultrathin film material comprises a single-component dispersion liquid and composite-component dispersion liquid; the ultrathin film material in the single-component dispersion liquid comprises a one-dimensional material and a two-dimensional material; the one-dimensional material comprises single-walled, double-walled and carbon nanotubes; the two-dimensional material comprises vermiculite and graphene; and the composite-component dispersion liquid is mixed liquid of two single-component dispersion liquid.

In the step S3, when the black color of the MXene film layer completely disappears and the nano ultrathin film layer becomes transparent, the oxidizing and bubbling process is finished; at the moment, the obtained oxidizing and bubbling substrate is subjected to liquid phase separation in the step S4.

Before vacuum suction filtration, the MXene dispersion liquid and the dispersion liquid of the ultrathin film material are both diluted with deionized water. Then bath type ultrasonic treatment is carried out for 3 min.

In step S1, the concentration of the MXene dispersion liquid is 0.1-5 mg/mL.

The oxidant solution is hydrogen peroxide or sodium hypochlorite solution with a concentration of 6 wt %.

The present disclosure has the beneficial effects that the MXene film layer and the nano ultrathin film layer are sequentially taken out from the substrate material in a suction filtration way by utilizing a vacuum suction filtration technology, and thus the substrate material is loaded with a double-layer structure of the MXene film layer and the nano ultrathin film layer; then oxidizing and bubbling is carried out on the MXene film layer through the oxidant to form the bubble layer between the substrate material and the nano ultrathin film layer, and thus the substrate material and the nano ultrathin film layer can be separated in a physical isolating mode; and finally, the nano ultrathin film is completely separated in a liquid phase floating separation mode. In the present disclosure, the substrate material and the ultrathin film material are not limited to one material, and a plurality of materials can be selected, expanded, and compounded. The obtained nano ultrathin film has a specific thickness and light transmittance due to different loading capacities, can be separated entirely from the substrate and float on the surface of a liquid phase and has the same structure, morphology, and performance as those on the substrate material. Meanwhile, only 4% of the water flux of the substrate material is reduced on average during oxidizing and bubbling each time, and the substrate material can be repeatedly utilized. The nano ultrathin film obtained through the method can be transferred to surfaces of materials such as glass, plastic, metal, and polymers and can be cut into any shape to be applied, so the application range is wide, and the plasticity is high.

DETAILED DESCRIPTION OF THE EMBODIMENTS

The present disclosure is described below in conjunction with specific implementation modes and specific embodiments:

A method for preparing a self-floating transparent nano ultrathin film includes the following steps:

S1, preparing an MXene film layer on a substrate material: preparing an MXene solution with a concentration of 0.1 to 10 mg/mL, as MXene dispersion liquid; collecting the MXene dispersion liquid with a volume of 0.0064 to 0.6714 mL, and performing suction filtration on the substrate material in a vacuum suction filtration way to obtain the MXene layer with a loading capacity of 0.01 to 0.05 mg/cm$^2$, to obtain an MXene substrate film layer with uniform thickness.

The MXene film layer in the embodiment of the present disclosure is obtained by suction filtration on the substrate material with a diameter of 2.5-10 cm. In actual implementation, the size of the ultrathin film can be determined according to the different suction filtration areas of a suction filtration device.

The substrate material can be a flexible mixed cellulose ester filter film, a microporous filter film, a polyethersulfone ultrafiltration film, or a rigid alumina filter film. The MXene dispersion liquid can be a $Ti_3C_2T_x$ aqueous solution with a concentration of 0.1-10 mg/mL. Preferably, the $Ti_2CT_x$ aqueous solution or the $Ti_2CT_x$ aqueous solution with a concentration of 0.1-5 mg/mL is used as the MXene dispersion liquid. Generally, when the concentration of the prepared MXene dispersion liquid is greater than 5 mg/mL and the loading capacity of the MXene film layer needing to be extracted is less than 0.5 mg/cm$^2$, preferably, the MXene dispersion liquid is added into about 20 mL of deionized water for dilution and uniform shaking up to ensure that the MXene dispersion liquid is completely spread on the substrate material, and then bath type ultrasound treatment is carried out for 3 min to make the MXene dispersion liquid have good dispersibility.

S2, performing suction filtration on a nano ultrathin film layer: preparing dispersion liquid of an ultrathin film material build blocks with a concentration of 0.16-0.6 mg/mL; taking the dispersion liquid of the ultrathin film material with a volume of 0.522-0.223 mL, and performing the treatment mode of the MXene dispersion liquid in the step S1: preferably adding the dispersion liquid of the ultrathin film material into about 20 mL deionized water for dilution and uniform shaking up, and then performing bath type ultrasonic treatment for 3 min to enable the dispersion liquid of the ultrathin film material to have good dispersibility; and performing suction filtration on the MXene substrate film layer obtained in the step S1 in a vacuum suction filtration way to obtain the nano ultrathin film layer with a loading capacity of 0.0008-0.05 mg/cm$^2$ to obtain a double-film structure on the substrate material, to obtain a double-film loaded substrate.

Specifically, the dispersion liquid of the ultrathin film material includes single-component dispersion liquid and composite-component dispersion liquid; the ultrathin film material in the single-component dispersion liquid includes a one-dimensional material and a two-dimensional material; the one-dimensional material includes a single-walled carbon nanotube, a double-walled carbon nanotube, and a multi-walled carbon nanotube; the two-dimensional material includes vermiculite and graphene, and the composite-component dispersion liquid is the mixed liquid of two single-component dispersion liquid. The composite-component dispersion liquid which is preferably adopted in the embodiment of the present disclosure, is a mixed liquid composed of single-walled carbon nanotube dispersion liquid and graphene dispersion liquid.

S3: performing oxidizing and bubbling; keeping a surface where the nano ultrathin film layer is located upward and standing the double-film loaded substrate on a surface of an oxidant solution at normal temperature to enable the oxidant solution to be transported upwards to the MXene film layer under the capillary action force of pores of the substrate material and enable MXene and an oxidant to be subjected to oxidation reaction in the MXene film layer to generate bubbles between the substrate material and the nano ultrathin film, thereby entering the oxidizing and bubbling process. When the black color of the MXene film layer completely disappears and the nano ultrathin film layer becomes transparent, the MXene and the oxidant are fully oxidized, the MXene material is completely oxidized, and bubbles are generated, namely, the oxidizing and foaming process is finished. At the moment, a bubble layer is formed between the substrate material and the nano ultrathin film layer, and the bubble layer is used as a separation layer to separate the substrate material from the ultrathin film layer to obtain a substrate loaded with the bubble layer and the nano ultrathin film.

The oxidant solution can be hydrogen peroxide or a sodium hypochlorite solution; the hydrogen peroxide with a concentration higher than 6 wt % can accelerate the MXene to oxidize to easily generate large-volume bubbles, and the hydrogen peroxide with a concentration lower than 6 wt % can slow down the oxidation speed of the MXene, so that the hydrogen peroxide with the concentration of 6 wt % is preferably selected to ensure the oxidation speed on the MXene film layer and generate the bubbles with proper sizes.

S4: performing liquid phase separation: obliquely inserting the substrate loaded with the bubble layer and the nano ultrathin film into a liquid phase oxidant solution, wherein the substrate material gradually sinks into the liquid phase solution, and the nano ultrathin film layer gradually floats upwards under the buoyancy support of the bubble layer until the bubble layer carries the nano ultrathin film layer to float on the surface of the liquid phase oxidant solution to be completely separated from the substrate material, thereby obtaining a nano ultrathin film.

The thickness of the obtained nano ultrathin film is 15-120 nm, and the light transmittance is 50-95%. In the present disclosure, the nano ultrathin film can be transferred to surfaces of glass, plastics, metals, polymers, and other materials and cut into any shape.

The present disclosure is further described in conjunction with the following specific embodiments:

Embodiment 1

Substrate material; Mixed cellulose ester (MCE) filter film;

MXene dispersion liquid: $Ti_3C_2T_x$ aqueous solution with a concentration of 10 mg/mL;

Dispersion liquid of ultrathin film material: Single-walled carbon nanotube dispersion liquid with a concentration of 0.36 mg/mL.

A method for preparing a self-floating transparent nano ultrathin film includes the following, steps:

Step 1, Preparing an MXene Film Layer on a Substrate Material:

Preparing a $Ti_3C_2T_x$ aqueous solution with a concentration of 10 mg/mL as MXene dispersion liquid; collecting the MXene dispersion liquid with a volume of 0.4141 mL, adding into 20 mL of deionized water, shaking the diluted MXene dispersion liquid for 20 s, and then performing bath type ultrasonic treatment for 3 min; and performing suction filtration on a mixed cellulose ester filter film with a diameter of 10 cm and a pore diameter of 25 nm in a vacuum suction filtration way to obtain a $Ti_3C_2T_x$ film layer with a loading capacity of 0.05 mg/cm$^2$, to obtain a $Ti_3C_2T_x$ substrate film layer with uniform thickness.

Step 2, Performing Suction Filtration on a Nano Ultrathin Film Layer:

Preparing single-walled carbon nanotube dispersion liquid with a concentration of 0.36 m/mL; collecting the single-walled carbon nanotube dispersion liquid with a volume of 0.1840 mL, and adding into 20 mL of deionized water; shaking the diluted single-walled carbon nanotube dispersion liquid for 20 s; then performing bath type ultrasonic treatment for 3 min; and performing suction filtration on the $Ti_3C_2T_x$ substrate film layer in a vacuum suction filtration way to obtain a single-walled carbon nanotube ultrathin film layer with a loading capacity of 0.0008 mg/cm$^2$ to form a double-film structure on the mixed cellulose ester filter film, to obtain a double-film loaded substrate.

Step 3, Oxidizing and Bubbling:

Keeping a surface where the single-wall carbon nanotube ultrathin film layer was located upward; transferring the double-film loaded substrate onto a surface of a hydrogen peroxide solution with a concentration of 6 wt % and standing at room temperature to enable the hydrogen peroxide solution to be upwards moved to a $Ti_3C_2T_x$ film layer through capillary acting force of pores of the mixed cellulose ester filter film and enable oxidization reaction between $Ti_3C_2T_x$ and hydrogen peroxide in the $Ti_3C_2T_x$ film layer, thereby continuously generating bubbles to realize bubbling. When the black color of the $T_3C_2T_x$ film layer completely disappeared and the single-walled carbon nanotube ultrathin film layer became transparent, oxidizing, and foaming could be finished. At the moment, a bubble layer was formed between the mixed cellulose ester filter film and the single-walled carbon nanotube ultrathin film layer; the bubble layer was used as a separation layer to separate the mixed cellulose ester filter film from the single-walled carbon nanotube ultrathin film layer to obtain the mixed cellulose ester filter film loaded with the bubble layer and the single-walled carbon nanotube ultrathin film layer.

Step 4, Performing Liquid Phase Separation:

Obliquely inserting the mixed cellulose ester filter film loaded with the bubble layer and the single-walled carbon nanotube ultrathin film layer into a liquid phase hydrogen peroxide solution at a certain angle, wherein the single-wailed carbon nanotube ultrathin film layer floated upwards under the buoyancy support of the bubble layer until the bubble layer carried the single-walled carbon nanotube ultrathin film layer to float on the surface of the liquid phase hydrogen peroxide solution, to be completely separated from the mixed cellulose ester filter film, thereby obtaining a single-walled carbon nanotube ultrathin film.

A quartz plate and a silicon wafer which were cleaned by bath type ultrasonic treatment for 10 min, were taken as substrates, respectively; the single-walled carbon nanotube ultrathin film obtained in the Embodiment 1 was taken out, and the light transmittance and the thickness of the obtained single-walled carbon nanotube ultrathin film were tested as follows: an ultraviolet light transmittance test was carried out on the quartz substrate to obtain that the light transmittance of the single-walled carbon nanotube ultrathin film was 95%, and an atomic force microscope test was carried out on the silicon wafer substrate to obtain that the thickness of the single-walled carbon nanotube ultrathin film was 15 nm.

Embodiment 2

Substrate material: Aluminum oxide (AAO) filter film;

MXene dispersion liquid: $Ti_3C_2T_x$ aqueous solution with a concentration of 0.1 mg/mL;

Dispersion liquid of ultrathin film material: Vermiculite dispersion liquid with a concentration of 0.6 mg/mL.

A method for preparing a self-floating transparent nano ultrathin film includes the following steps:

Step 1, Preparing an MXene Film Layer on a Substrate Material:

Preparing a $Ti_3C_2T_x$ aqueous solution with a concentration of 0.1 mg/mL as MXene dispersion liquid: collecting the MXene dispersion liquid with a volume of 0.6714 mL, adding into 20 deionized water, shaking the diluted MXene dispersion liquid for 20 s, and then performing bath type ultrasonic treatment for 3 min; and performing suction filtration on an aluminum oxide filter film with a diameter of 2.5 cm and a pore diameter of 200 nm in a vacuum suction filtration way to obtain a $Ti_3C_2T_x$ film layer with a loading capacity of 0.025 mg/cm$^2$, to obtain a substrate film layer with uniform thickness.

Step 2, Performing Suction Filtration on a Nano Ultrathin Film Layer:

Preparing vermiculite dispersion liquid with a concentration of 0.6 mg/mL; collecting the vermiculite dispersion liquid with a volume of 0.223 mL, and adding into 20 mL of deionized water; shaking the diluted vermiculite dispersion liquid for 20 s; then performing bath type ultrasonic treatment for 3 min; and performing suction filtration on the $Ti_3C_2T_x$ substrate film layer in a vacuum suction filtration way to obtain a vermiculite ultrathin film layer with a loading capacity of 0.05 mg/cm² to form a double-film structure on the substrate material, to obtain a double-film loaded substrate.

Step 3, Oxidizing and Bubbling:

Keeping a surface where the vermiculite ultrathin film layer was located upward; transferring the double-film loaded substrate onto a surface of a hydrogen peroxide solution with a concentration of 6 wt % and standing at room temperature to enable the hydrogen peroxide solution to be upwards moved to a $Ti_3C_2T_x$ film layer through capillary acting force of pores of the aluminum oxide filter film and enable oxidization reaction between $Ti_3C_2T_x$ and hydrogen peroxide in the $Ti_3C_2T_x$ film layer, thereby continuously generating bubbles to realize bubbling. When the black color of the $Ti_3C_2T_x$ film layer completely disappeared and the vermiculite ultrathin film layer became transparent, oxidizing, and foaming could be finished. At the moment, a bubble layer was formed between the aluminum oxide filter film and the vermiculite ultrathin film layer; the bubble layer was used as a separation layer to separate the $Ti_3C_2T_x$ film layer from the vermiculite nanotube ultrathin film layer to obtain the aluminum oxide filter film loaded with the bubble layer and the vermiculite ultrathin film layer.

Step 4, Performing Liquid Phase Separation:

Obliquely inserting the aluminum oxide filter film loaded with the bubble layer and the vermiculite ultrathin film layer into a liquid phase hydrogen peroxide solution at a certain angle, wherein the vermiculite ultrathin film layer floated upwards under the buoyancy support of the bubble layer until the bubble layer carried the vermiculite ultrathin film layer to float on the surface of the liquid phase hydrogen peroxide solution, to be completely separated from the aluminum oxide filter film, thereby obtaining an ultrathin vermiculite film.

A quartz plate and a silicon wafer which were cleaned by bath-type ultrasonic treatment for 10 min were taken as substrates, respectively; the ultrathin vermiculite film obtained in the Embodiment 2 was taken out from the hydrogen peroxide solution from bottom to top, and the light transmittance and the thickness of the obtained vermiculite ultrathin film were tested as follows: an ultraviolet light transmittance test was carried out on the quartz substrate to obtain that the light transmittance of the vermiculite ultrathin film was 93%, and an atomic force microscope test was carried out on the silicon wafer substrate to obtain that the thickness of the vermiculite ultrathin film was 70 nm.

Embodiment 3

Substrate material; Aluminum oxide (AAO) filter film;

MXene dispersion liquid: $Ti_3C_2T_x$ aqueous solution with a concentration of 4.18 mg/mL;

Dispersion liquid of ultrathin film material: Composite dispersion liquid composed of 0.011 mL of single-walled carbon nanotube dispersion liquid with a concentration of 0.36 mg/mL, and 0.058 mL of grapheme dispersion liquid with a concentration of 0.16 mg/mL.

A method for preparing a self-floating transparent nano ultrathin film includes the following steps:

Step 1, Preparing an MXene Film Layer on a Substrate Material:

Preparing a $Ti_3C_2T_x$ aqueous solution with a concentration of 4.18 mg/mL as MXene dispersion liquid; collecting the MXene dispersion liquid with a volume of 0.0064 mL, adding into 20 mL of deionized water, shaking the diluted MXene dispersion liquid for 20 s, and then performing bath type ultrasonic treatment for 3 min; and performing suction filtration on an aluminum oxide filter film with a diameter of 2.5 cm and a pore diameter of 100 nm in a vacuum suction filtration way to obtain a $Ti_3C_2T_x$ film layer with a loading capacity of 0.01 mg/cm², to obtain a $Ti_3C_2T_x$ substrate film layer with uniform thickness.

Step 2, Performing Suction Filtration, on a Nano Ultrathin Film Layer:

Collecting composite dispersion liquid composed of 0.011 mL of single-walled carbon nanotube dispersion liquid with a concentration of 0.36 mg/mL and 0.058 mL of grapheme dispersion liquid with a concentration of 0.16 mg/mL; adding the composite dispersion liquid into 20 mL, of deionized water; shaking the diluted vermiculite dispersion liquid for 20 s; then performing bath type ultrasonic treatment for 3 min; and performing suction filtration on the $Ti_3C_2T_x$ substrate film layer in a vacuum suction filtration way to obtain a composite ultrathin film layer with a loading capacity of 0.005 mg/cm² to form a double-film structure on the substrate material, to obtain a double-film loaded substrate.

Step 3, Oxidizing and Bubbling:

Keeping a surface where the composite ultrathin film layer was located upward; transferring the double-film loaded substrate onto a surface of a hydrogen peroxide solution with a concentration of 6 wt % and standing at room temperature to enable the hydrogen peroxide solution to be upwards moved to a $Ti_3C_2T_x$ film layer through capillary acting force of pores of the aluminum oxide filter film and enable oxidization reaction between $Ti_3C_2T_x$ and hydrogen peroxide in the $Ti_3C_2T_x$ film layer, thereby continuously generating bubbles to realize bubbling. When the black color of the $Ti_3C_2T_x$ film layer completely disappeared and the composite ultrathin film layer became transparent, oxidizing, and foaming could be finished. At the moment, a bubble layer was formed between the aluminum oxide filter film and the composite ultrathin film layer; the bubble layer was used as a separation layer to separate the aluminum oxide film from the composite ultrathin film layer to obtain the aluminum oxide filter film loaded with the bubble layer and the composite ultrathin film layer.

Step 4, Performing Liquid Phase Separation:

Obliquely inserting the aluminum oxide filter film loaded with the bubble layer and the composite ultrathin film layer into a liquid phase hydrogen peroxide solution at a certain angle, wherein the composite ultrathin film layer floated upwards under the buoyancy support of the bubble layer until the bubble layer carried the composite ultrathin film layer to float on the surface of the liquid phase hydrogen peroxide solution, to be completely separated from the $Ti_3C_2T_x$ substrate film layer, thereby obtaining a grapheme and single-walled carbon nanotube composite ultrathin film.

A quartz plate and a silicon wafer which were cleaned by bath-type ultrasonic treatment for 10 min were taken as substrates, respectively; the ultrathin composite film obtained in the Embodiment 3 was taken out from the hydrogen peroxide solution from bottom to top, and the light transmittance and the thickness of the obtained composite ultrathin film were tested as follows: an ultraviolet light transmittance test was carried out on the quartz substrate to obtain that the light transmittance of the ultrathin composite film was 76%, and an atomic force microscope test was carried out on the silicon wafer substrate to obtain that the thickness of the ultrathin composite film was 51 nm.

Embodiment 4

Substrate material: microporous filter film;

MXene dispersion liquid: $Ti_2CT_x$ aqueous solution with a concentration of 3.7 mg/mL;

Dispersion liquid of ultrathin film material: Double-walled carbon nanotube dispersion liquid with a concentration of 0.27 mg/mL.

A method for preparing a self-floating transparent nano ultrathin film includes the following steps:

Step 1, Preparing an MXene Film Layer on a Substrate Material:

Preparing a $Ti_2CT_x$ aqueous solution with a concentration of 3.7 mg/mL as MXene dispersion liquid; collecting the MXene dispersion liquid with a volume of 0.0363 mL, adding into 20 mL of deionized water, shaking the diluted MXene dispersion liquid for 20 s, and then performing bath type ultrasonic treatment for 3 min; and performing suction filtration on a microporous filter film with a diameter of 2.5 cm and a pore diameter of 4-50 nm in a vacuum suction filtration way to obtain a $Ti_2CT_x$ film layer with a loading capacity of 0.01 mg/cm$^2$, to obtain a $Ti_2CT_x$ substrate film layer with uniform thickness.

Step 2, Performing Suction Filtration on a Nano Ultrathin Film Layer:

Collecting 0.0878 mL of double-walled carbon nanotube dispersion liquid with a concentration of 0.27 mL, and adding into 20 mL of deionized water; shaking the diluted double-walled carbon nanotube dispersion liquid for 20 s; then performing bath-type ultrasonic treatment for 3 min; and performing suction filtration on the $Ti_2CT_x$ substrate film layer in a vacuum suction filtration way to obtain a double-walled carbon nanotube ultrathin film layer with a loading capacity of 0.009 mg/cm$^2$ to form a double-film structure on the substrate material, to obtain a double-film loaded substrate.

Step 3, Oxidizing and Bubbling:

Keeping a surface where the double-walled carbon nanotube ultrathin film layer was located upward; transferring the double-film loaded substrate onto a surface of a hydrogen peroxide solution with a concentration of 6 wt % and standing at room temperature to enable the hydrogen peroxide solution to be upwards moved to a $Ti_2CT_x$ film layer through capillary acting force of pores of the microporous filter film and enable oxidization reaction between $Ti_2CT_x$ and hydrogen peroxide in the $Ti_2CT_x$ film layer, thereby continuously generating bubbles to realize bubbling. When the black color of the $Ti_2CT_x$ film layer completely disappeared and the double-walled carbon nanotube ultrathin film layer became transparent, oxidizing, and foaming could be finished. At the moment, a bubble layer was formed between the microporous filter film and the double-walled carbon nanotube ultrathin film layer; the bubble layer was used as a separation layer to separate the $Ti_2CT_x$ filter film from the double-walled carbon nanotube ultrathin film layer to obtain the microporous filter film loaded with the bubble layer and the double-walled carbon nanotube ultrathin film layer.

Step 4, Performing Liquid Phase Separation:

Obliquely inserting the microporous filter film loaded with the bubble layer and the double-walled carbon nanotube ultrathin film layer into a liquid phase hydrogen peroxide solution at a certain angle, wherein the double-walled carbon nanotube ultrathin film layer floated upwards under the buoyancy support of the bubble layer until the bubble layer carried the double-walled carbon nanotube ultrathin film layer to float on the surface of the liquid phase hydrogen peroxide solution, to be completely separated from the microporous filter film, thereby obtaining a double-walled carbon nanotube ultrathin film.

A quartz plate and a silicon wafer which were cleaned by bath-type ultrasonic treatment for 10 min were taken as substrates, respectively; the double-walled carbon nanotube ultrathin film obtained in the Embodiment 4 was taken out from the hydrogen peroxide from bottom to top, and the light transmittance and the thickness of the obtained double-walled carbon nanotube ultrathin film were tested as follows: an ultraviolet light transmittance test was carried out on the quartz substrate to obtain that the light transmittance of the double-walled carbon nanotube ultrathin film was 64%, and an atomic force microscope test was carried out on the silicon wafer substrate to obtain that the thickness of the double-walled carbon nanotube ultrathin film was 49 nm.

Embodiment 5

Substrate material: Polyether sulfone (PES) filter film;

MXene dispersion liquid: $Ti_2CT_x$ aqueous solution with a concentration of 3.7 mg/mL;

Dispersion liquid of ultrathin film material: Multi-walled carbon nanotube dispersion liquid with a concentration of 0.454 mg/mL.

A method for preparing a self-floating transparent nano ultrathin film includes the following steps:

Step 1, Preparing an MXene Film Layer on a Substrate Material:

Preparing a $Ti_2CT_x$ aqueous solution with a concentration of 3.7 mg/mL gas MXene dispersion liquid; collecting the MXene dispersion liquid with a volume of 0.0072 mL, adding into 20 mL of deionized water, shaking the diluted MXene dispersion liquid for 20 s, and then performing bath type ultrasonic treatment for 3 min; and performing suction filtration on a polyether sulfone filter film with a diameter of 2.5 cm and a pore diameter of 450 nm in a vacuum suction filtration way to obtain a $Ti_2CT_x$ film layer with a loading capacity of 0.01 mg/cm$^2$, to obtain a $Ti_2CT_x$ substrate film layer with uniform thickness.

Step 2, Performing Suction Filtration on a Nano Ultrathin Film Layer:

Collecting the multi-walled carbon nanotube dispersion liquid with a volume of 0.0522 mL and a concentration of 0.454 mg/mL, and adding into 20 mL of deionized water; shaking the diluted multi-walled carbon nanotube dispersion liquid liar 20 s; then performing bath type ultrasonic treatment for 3 min; and performing suction filtration on the $Ti_2CT_x$ substrate film layer in a vacuum suction filtration way to obtain a multi-walled carbon nanotube ultrathin film layer with a loading capacity of 0.009 mg cm$^2$ to form a double-film structure on the substrate material, to obtain a double-film loaded substrate.

Step 3, Oxidizing and Bubbling:

Keeping a surface where the multi-walled carbon nanotube ultrathin film layer was located upward; transferring the double-film loaded substrate onto a surface of a hydrogen peroxide solution with a concentration of 6 wt % and standing at room temperature to enable the hydrogen peroxide solution to be upwards moved to a $Ti_2CT_x$ film layer through capillary acting force of pores of the polyether sulfone filter film and enable oxidization reaction between $Ti_2CT_x$ and hydrogen peroxide in the $Ti_2CT_x$ film layer, thereby continuously generating bubbles to realize bubbling. When the black color of the $Ti_2CT_x$ film layer completely disappeared and the multi-walled carbon nanotube ultrathin film layer became transparent, oxidizing, and foaming could be finished. At the moment, a bubble layer was formed between the polyether sulfone filter film and the multi-walled carbon nanotube ultrathin film layer; the bubble layer was used as a separation layer to separate the polyether sulfone filter film from the multi-walled carbon nanotube ultrathin film layer to obtain the polyether sulfone filter film loaded with the bubble layer and the multi-walled carbon nanotube ultrathin film layer.

Step 4, Performing Liquid Phase Separation:

Obliquely inserting the polyether sulfone filter film loaded with the bubble layer and the multi-walled carbon nanotube ultrathin film layer into a liquid phase hydrogen peroxide solution at a certain angle, wherein the multi-walled carbon nanotube ultrathin film layer floated upwards under the buoyancy support of the bubble layer until the bubble layer carried the multi-walled carbon nanotube ultrathin film layer to float on the surface of the liquid phase hydrogen peroxide solution, to be completely separated from the $Ti_2CT_x$ substrate film layer, thereby obtaining a multi-walled carbon nanotube ultrathin film.

A quartz plate and a silicon wafer which were cleaned by bath type ultrasonic treatment for 10 min were taken as substrates, respectively; the multi-walled carbon nanotube ultrathin film obtained in the Embodiment 5 was taken out from the hydrogen peroxide solution from the bottom to top, and the light transmittance and the thickness of the obtained multi-walled carbon nanotube ultrathin film were tested as follows: an ultraviolet light transmittance test was carried out on the quartz substrate to obtain that the light transmittance of the multi-walled carbon nanotube ultrathin film was 50%, and an atomic force microscope test was carried out on the silicon wafer substrate to obtain that the thickness of the multi-walled carbon nanotube ultrathin film was 120 nm.

What is claimed is:

1. A method for preparing a self-floating transparent nano ultrathin film, comprising the following steps:
    S1: preparing an MXene film layer on a substrate material: preparing MXene dispersion liquid with a concentration of 0.1-10 mg/mL; collecting the MXene dispersion liquid with a volume of 0.0064-0.6714 mL, and performing suction filtration on the substrate material in a vacuum suction filtration way to obtain the MXene film layer with a loading capacity of 0.01-0.05 mg/cm², thereby obtaining an MXene substrate film layer with uniform thickness;
    S2: performing suction filtration on a nano ultrathin film layer: preparing a dispersion liquid of ultrathin film building blocks with a concentration of 0.16-0.6 mg/mL; taking the dispersion liquid of the ultrathin film material with a volume of 0.0522-0.223 mL, and performing suction filtration on the MXene substrate film layer obtained in the step S1 in a vacuum suction filtration way to obtain the nano ultrathin film layer with a loading capacity of 0.0008-0.05 mg/cm² to form a double-film structure on the substrate material, to obtain a double-film loaded substrate;
    S3: oxidizing and bubbling: keeping a surface where the nano ultrathin film layer is located upward and standing the double-film loaded substrate on a surface of an oxidant solution at normal temperature to enable the oxidant solution to be transported upwards to the MXene film layer under the capillary action force of pores of the substrate material and enable an oxidant and MXene to be subjected to oxidation reaction to generate bubbles, thereby forming a bubble layer between the substrate material and the nano ultrathin film layer, the bubble layer serving as a separation layer to separate the substrate material from the ultrathin film layer to obtain a substrate loaded with the bubble layer and the nano ultrathin film;
    S4: performing liquid phase separation: obliquely inserting the substrate loaded with the bubble layer and the nano ultrathin film into a liquid phase oxidant solution until the bubble layer carries the nano ultrathin film layer to float on the surface of the liquid phase oxidant solution to be completely separated from the substrate material, thereby obtaining a nano ultrathin film, wherein the thickness of the nano ultrathin film is 15-120 nm, and the light transmittance is 50-95%.

2. The method for preparing the self-floating transparent nano ultrathin film according to claim 1, wherein the MXene dispersion liquid is a $Ti_3C_2T_x$ aqueous solution or a $Ti_2CT_x$ aqueous solutions.

3. The method for preparing the self-floating transparent nano ultrathin film according to claim 1, wherein the substrate material comprises a mixed cellulose ester filter film, a microporous filter film, a polyether sulfone ultrafiltration film, and an aluminum oxide filter film.

4. The method for preparing the self-floating transparent nano ultrathin film according to claim 1, wherein in the step S2, the dispersion liquid of the ultrathin film material comprises single-component dispersion liquid and composite-component dispersion liquid; the ultrathin film material in the single-component dispersion liquid comprises a one-dimensional material and a two-dimensional material; the one-dimensional material comprises single-walled, double-walled and multi-walled carbon nanotubes; the two-dimensional material comprises vermiculite and graphene; and the composite-component dispersion liquid is the mixed liquid of two single-component dispersion liquid.

5. The method for preparing the self-floating transparent nano ultrathin film according to claim 1, wherein in the step S3, when the black color of the MXene film layer completely disappears and the nano ultrathin film layer becomes transparent, the oxidizing and bubbling process is finished; and at the moment, the obtained oxidizing and bubbling substrate is subjected to liquid phase separation in the step S4.

6. The method for preparing the self-floating transparent nano ultrathin film according to claim 1, wherein before vacuum suction filtration, the MXene dispersion liquid and the dispersion liquid of the ultrathin film material are both diluted with deionized water; then bath-type ultrasonic treatment is carried out for 3 min.

7. The method for preparing the self-floating transparent nano ultrathin film according to claim 1, wherein in step S1, the concentration of the MXene dispersion liquid is 0.1-5 mg/mL.

8. The method for preparing the self-floating transparent nano ultrathin film according to claim 1, wherein the oxidant solution is hydrogen peroxide or sodium hypochlorite solution with a concentration of 6 wt %.

* * * * *